US011742498B1

(12) United States Patent
Vilekar et al.

(10) Patent No.: US 11,742,498 B1
(45) Date of Patent: Aug. 29, 2023

(54) THERMAL MANAGEMENT OF A SOLID OXIDE FUEL CELL SYSTEM

(71) Applicant: PRECISION COMBUSTION, INC., North Haven, CT (US)

(72) Inventors: Saurabh Vilekar, Woodbridge, CT (US); Christian Junaedi, Cheshire, CT (US); Eric Edward Allocco, Cheshire, CT (US); Christopher Howard, Stratford, CT (US)

(73) Assignee: PRECISION COMBUSTION, INC., North Haven, CT (US)

(*) Notice: Subject to any disclaimer, the term of this patent is extended or adjusted under 35 U.S.C. 154(b) by 249 days.

(21) Appl. No.: 16/893,850

(22) Filed: Jun. 5, 2020

Related U.S. Application Data

(60) Provisional application No. 62/859,246, filed on Jun. 10, 2019.

(51) Int. Cl.
  *H01M 8/00* (2016.01)
  *H01M 8/04007* (2016.01)
  *H01M 8/04701* (2016.01)

(52) U.S. Cl.
  CPC ... *H01M 8/04074* (2013.01); *H01M 8/04708* (2013.01); *H01M 8/04716* (2013.01)

(58) Field of Classification Search
  CPC ......... H01M 8/04074; H01M 8/04708; H01M 8/04716
  See application file for complete search history.

(56) References Cited

U.S. PATENT DOCUMENTS

| 5,763,114 | A | 6/1998 | Khandkar |
| 7,422,812 | B2* | 9/2008 | Haltiner, Jr. ...... H01M 8/04089 |
| | | | 429/440 |
| 7,524,572 | B2 | 4/2009 | Venkataraman |
| 10,411,281 | B1 | 9/2019 | Vilekar |
| 2003/0235731 | A1 | 12/2003 | Haltiner, Jr. |

(Continued)

FOREIGN PATENT DOCUMENTS

| EP | 1202366 A2 | 5/2002 |
| EP | 1620909 B1 | 11/2012 |
| WO | WO2020101929 A1 | 5/2020 |

*Primary Examiner* — Cynthia H Kelly
*Assistant Examiner* — Monique M Wills
(74) *Attorney, Agent, or Firm* — Marie Zuckerman; Andrew D. Gathy

(57) ABSTRACT

This invention pertains to methods for controlling thermal aspects during operation of a solid oxide fuel cell (SOFC) system, including controlling target cathode and anode inlet stream temperatures and differential temperatures defined by the anode and cathode inlet and outlet streams. In one aspect, thermal management is achieved by controlling a combustion stream temperature and by employing one heat exchanger having two cold side pathways. In another aspect, thermal management is achieved by controlling a temperature of a combustion stream distributed through a cathode feed heat exchanger and an anode feed heat exchanger, optionally with bypassing a portion of the cathode air stream around the cathode feed heat exchanger. In another aspect, thermal management is achieved by employing a cathode feed heat exchanger to heat a cathode air stream and by employing an equalizer heat exchanger to equilibrate temperatures of the resulting heated cathode air stream and an anode fuel stream.

8 Claims, 7 Drawing Sheets

(56) References Cited

U.S. PATENT DOCUMENTS

| | | | | |
|---|---|---|---|---|
| 2009/0253007 A1* | 10/2009 | Mergler | ............ | H01M 8/04014 429/442 |
| 2010/0003562 A1* | 1/2010 | Kading | ............. | H01M 8/04022 429/465 |
| 2016/0190622 A1* | 6/2016 | Whyatt | ............. | H01M 8/04097 429/423 |

* cited by examiner

THERMAL MANAGEMENT OF A SOLID OXIDE FUEL CELL SYSTEM

CROSS-REFERENCE TO RELATED APPLICATIONS

This application claims benefit of U.S. Provisional Patent Application No. 62/859,246, filed Jun. 10, 2019.

GOVERNMENT RIGHTS

This invention was made with support from the U.S. Government under Contract No. HTC711-17-C-D003, sponsored by the US Transportation Command (US TRANSCOM). The U.S. Government holds certain rights in this invention.

FIELD OF THE INVENTION

This invention pertains to methods and apparatuses for use in thermal management of a Solid Oxide Fuel Cell (SOFC) system and other high temperature fuel cell systems, such as, molten carbonate fuel cell systems.

BACKGROUND OF THE INVENTION

Thermal management of an SOFC system is of paramount importance to allow for safe operation and efficient use of thermal energy available to the system. An SOFC system is comprised of at least one SOFC stack constructed of individual electrochemical cells, referred to herein as "repeat units". Each repeat unit comprises layers of the following components in a sandwich configuration: a cathode where reduction of an oxidant, typically molecular oxygen, occurs to form oxide ions; an electrolyte for transporting the oxide ions from the cathode to an anode; and the anode where a fuel is converted in the presence of the oxide ions to an oxidized chemical product with production of an electrical current. The SOFC stack utilizes a fuel enriched in hydrogen ($H_2$), either as pure hydrogen or as a reformate comprising hydrogen in admixture with carbon monoxide obtained through reformation of a hydrocarbon fuel. The oxidized chemical product comprises water in the case of hydrogen fuel and carbon dioxide in the case of carbon monoxide fuel. The electrochemical reaction of fuel and oxidant in the SOFC stack generates thermal and electrical energy.

The fuel is consumed at the anode of the SOFC stack, but not all of the fuel is consumed. Fuel consumption is typically about 80 percent or less. At any given fuel stream flow rate to the anode ("anode fuel flowrate"), the thermal energy and electrical power generated by the SOFC stack depend upon fuel utilization. A higher fuel utilization typically results in a higher stack efficiency as well as more thermal energy generation. The remainder of the unconsumed fuel exhausting the SOFC stack as an "anode tail gas" (ATG) typically is burned in a combustor (burner) disposed downstream of the stack, thereby producing additional thermal energy. A native source of air or a fraction of cathode tail gas (CTG) provides the oxygen needed for the combustor.

A temperature gradient exists across the SOFC stack from anode inlet stream to anode outlet stream ($\Delta Ta$) as well as from cathode inlet stream to cathode outlet stream ($\Delta Tc$). The amount of oxidant (air or oxygen) fed to the cathode inlet of the SOFC is controlled or adjusted so as to maintain the desired temperature differential $\Delta Ta$ and $\Delta Tc$ across the respective inlet streams and outlet streams; that is, the air acts as a cooling agent to remove heat generated by the electrochemical reaction on the anode side of the stack. Furthermore, minimum inlet temperatures for both the anode inlet stream (Ta) and the cathode inlet stream (Tc) to the stack are desirably maintained under steady state operating conditions in order to retain effective ionic conductivity of the electrolyte and electrochemical activity of the electrodes. To achieve target inlet stream temperatures, the anode fuel stream, namely, the hydrogen fuel or hydrogen-rich reformate fuel, and the cathode oxidant stream, namely, the air, are preheated using preheat exchangers.

In each SOFC repeat unit, the anode, cathode and electrolyte are typically constructed of ceramic materials. Thermal stress associated with a non-uniform temperature distribution across the fuel cell repeat unit due to rapid heating or cooling is highly undesirable. Accordingly, a maximum heating or cooling rate for the SOFC stack should not be violated during heat-up and cool-down, respectively. Additionally, it is desirable to minimize a thermal differential $\Delta Ta\text{-}c$ across the anode inlet stream and the cathode inlet stream to the SOFC, so as to minimize the possibility of cell fracture that might result from varied thermal expansion coefficients of the anode and cathode layers of the repeat units.

Heat exchangers utilized to heat the anode and cathode feed streams to the respective anode and cathode inlets of the SOFC stack should provide system control across all operating regimes including start-up, transients with load following, steady state operation, and shut down. Consequently, thermal management and control strategies for an SOFC stack are needed that satisfy any one and, preferably, multiple objectives across all operating regimes. In particular, it would be desirable to achieve target minimum temperatures for both the anode inlet stream (Ta) and the cathode inlet stream (Tc) to the SOFC stack. It would be desirable further to maintain a target temperature differential $\Delta Ta$ across the anode inlet stream and anode outlet stream of the SOFC stack. Likewise, it would be desirable to maintain a desired temperature differential between the cathode inlet stream and the cathode outlet stream ($\Delta Tc$) of the SOFC stack. Accordingly, it would also be desirable to maintain a target temperature differential, $\Delta Ta\text{-}c$, across the anode inlet stream and cathode inlet stream of the SOFC stack. Finally, it would be desirable to maintain a target heating rate for the stack during system warmup and a target cool-down rate during system shutdown, while also maintaining thermal management control. In other words, unacceptable thermal excursions should be avoided during warmup and cool-down, so as to reduce as much as possible damage to the repeat units of the stack. If possible, it would be desirable to perform the thermal management function meeting all operational requirements using at most two heat exchangers.

SUMMARY OF THE INVENTION

In one aspect, this invention pertains to a first method of thermal management of a solid oxide fuel cell system, comprising:
(a) passing a combustion stream into a hot side of a heat exchanger;
(b) passing a cathode air stream into a first cool side of the heat exchanger;
(c) passing an anode fuel stream into a second cool side of the heat exchanger;
(d) varying temperature of the combustion stream and thereafter transferring heat from the combustion stream to the cathode air stream and to the anode fuel stream passing through the first and second cool sides, respectively, of the heat exchanger, so as to produce a cathode inlet stream to an SOFC stack at a target cathode inlet stream temperature and an anode inlet stream to the SOFC stack at a target anode inlet stream temperature.

To be clear, the cathode inlet stream exits the heat exchanger and then enters into a cathode side of the solid oxide fuel cell stack; while the anode inlet stream exits the heat exchanger and then enters into an anode side of the solid oxide fuel cell stack. The temperature of the combustion stream is controlled primarily by varying an air-to-fuel ratio (AFR) within a combustor from which the combustion stream is derived.

In a related aspect, this invention pertains to a first heat exchanger apparatus, comprising a housing configured with a combustion stream inlet, a combustion stream outlet, a cathode air stream inlet, a cathode air stream outlet, an anode fuel stream inlet, and an anode fuel stream outlet; and further has disposed therein:
  (a) a hot side pathway fluidly connected on one end to the combustion stream inlet and on an opposite end to the combustion stream outlet;
  (b) a first cool side pathway fluidly connected on one end to the cathode air stream inlet and on an opposite end to the cathode air stream outlet;
  (c) a second cool side pathway fluidly connected on one end to the anode fuel stream inlet and on an opposite end to the anode fuel stream outlet;
wherein the hot side pathway is in thermal communication with both the first cool side pathway and the second cool side pathway; and further wherein the first cool side pathway and the second cool side pathway are configured in the shape of a double helix disposed within the hot side pathway.

In another aspect, this invention pertains to a second method of thermal management of a solid oxide fuel cell system, comprising:
  (a) splitting a primary combustion stream into a first combustion stream and a second combustion stream;
  (b) passing the first combustion stream into a hot side of a cathode feed heat exchanger;
  (c) passing a cathode air stream into a cool side of the cathode feed heat exchanger, and transferring heat from the first combustion stream to the cathode air stream so as to provide a cathode inlet stream to an SOFC stack at a cathode inlet stream target temperature;
  (d) passing the second combustion stream into a hot side of an anode feed heat exchanger;
  (e) passing an anode fuel stream into a cool side of the anode feed heat exchanger, and transferring heat from the second combustion stream to the anode fuel stream so as to provide an anode inlet stream to the SOFC stack at a target anode inlet stream temperature.

In another embodiment, the second method further comprises feeding cooling air into the primary combustion stream prior to splitting the primary combustion stream into the first combustion stream and the second combustion stream. The cooling air functions to provide additional control over the temperature of the combustion stream. Alternatively, in another embodiment two cooling air streams can individually be added to the first combustion stream and the second combustion stream. Each cooling air stream can be individually controlled to independently control the temperature of the first combustion stream and the temperature of the second combustion stream.

In yet another embodiment, the second method further comprises splitting the cathode air stream, which for this embodiment may be referenced as the "primary cathode air stream", into a first cathode air stream and a second cathode air stream. The first cathode air stream is fed into the cool side of the cathode feed heat exchanger, wherein heat is transferred from the first combustion stream to the first cathode air stream so as to provide a heated cathode air stream. The second cathode air stream is bypassed around the cathode feed heat exchanger. Thereafter, the second cathode air stream (bypass cathode air stream) is merged into the heated cathode air stream; and the resulting cathode inlet stream at a target cathode inlet stream temperature is fed into the cathode side of the solid oxide fuel cell stack. Splitting and bypassing a portion of the cathode air stream around the cathode feed heat exchanger provides additional control over the cathode inlet stream temperature to the SOFC stack.

In yet another embodiment, the second method further comprises splitting the anode fuel stream, which for this embodiment may be referenced as the "primary anode fuel stream", into a first anode fuel stream and a second anode fuel stream. The first anode fuel stream is fed into the cool side of the anode feed heat exchanger, wherein heat is transferred from the second combustion stream to the first anode fuel stream so as to provide a heated anode fuel stream. The second anode fuel stream is bypassed around the anode feed heat exchanger. Thereafter, the second anode fuel stream (bypass anode fuel stream) is merged into the heated anode fuel stream; and the resulting combined anode inlet stream at a target anode inlet stream temperature is fed into the anode side of the solid oxide fuel cell stack. Splitting and bypassing a portion of the anode fuel stream around the anode feed heat exchanger provides additional control over the anode inlet stream temperature to the SOFC stack.

The aforementioned second method is related to a second apparatus for thermal management of a solid oxide fuel cell system, comprising:
  (a) a primary combustion stream pathway divided at one end into a first combustion stream pathway and a second combustion stream pathway;
  (b) a cathode feed heat exchanger comprising a first hot side pathway in thermal communication with a first cold side pathway; the first hot side pathway being fluidly connected at an inlet end to the first combustion stream pathway and being fluidly connected at an outlet end to a cooled first combustion stream pathway; the first cold side pathway being fluidly connected at an inlet end to a cathode air stream pathway and being fluidly connected at an outlet end to a cathode inlet stream pathway to an SOFC stack;
  (c) an anode feed heat exchanger comprising a second hot side pathway in thermal communication with a second cold side pathway; the second hot side pathway being fluidly connected at an inlet end to the second combustion stream pathway and fluidly connected at an outlet end to a cooled second combustion stream pathway; the second cold side pathway fluidly connected at an inlet end to an anode fuel stream pathway and fluidly connected at an outlet end to an anode inlet stream pathway to the SOFC stack.

In yet another aspect, this invention pertains to a third method of thermal management of a solid oxide fuel cell system, comprising:
  (a) splitting a primary cathode air stream into a first cathode air stream and a second cathode air stream;
  (b) passing the first cathode air stream into a cool side of a cathode feed heat exchanger;
  (c) feeding a combustion stream into a hot side of the cathode feed heat exchanger and transferring heat from the combustion stream to the first cathode air stream so as to produce a heated first cathode air stream exiting the cathode feed heat exchanger;
(d) bypassing the second cathode air stream around the cathode feed heat exchanger and merging said second cathode air stream into the heated first cathode air stream so as to produce a combined cathode air stream;
(e) feeding the combined cathode air stream into a first side of an equalizer heat exchanger;
(f) feeding an anode fuel stream into a second side of the equalizer heat exchanger; and transferring heat between the first and second sides of the equalizer heat exchanger, so as to provide a cathode inlet stream to an SOFC stack at a cathode inlet stream target temperature and an anode inlet stream to the SOFC stack at an anode inlet stream target temperature.

In an embodiment related to any one of the first, second and third methods of this invention, the cathode inlet stream at the cathode inlet stream target temperature is fed into a cathode side of the SOFC stack; while the anode inlet stream at the anode inlet stream target temperature is fed into the anode side of the SOFC stack.

In another embodiment related to any one of the first, second and third methods of this invention, the first cathode air stream is preheated in a preheat exchanger prior to being fed into the cathode feed heat exchanger. In yet another embodiment related to any one of the first, second and third methods of this invention, the anode fuel stream is preheated in a preheat exchanger prior to being fed into the anode feed heat exchanger or the equalizer heat exchanger.

This invention also pertains to a third apparatus for thermal management of a solid oxide fuel cell system, comprising:
(a) a primary cathode air stream pathway divided at one end into a first cathode air stream pathway and a second (or bypass) cathode air stream pathway;
(b) a cathode feed heat exchanger having a hot side pathway in thermal communication with a cold side pathway; the hot side pathway being fluidly connected on one end to a combustion stream inlet pathway and fluidly connected at another end to a combustion stream outlet pathway; the cold side pathway being in fluid communication at one end with the first cathode air stream pathway and in fluid communication at another end with a heated first cathode air stream pathway; further wherein the second (or bypass) cathode air stream pathway fluidly connects to the heated first cathode air stream pathway so as to form a heated combined cathode air stream pathway;
(c) an equalizer heat exchanger comprising a first side pathway and a second side pathway, wherein the first side pathway fluidly connects at an inlet end with the heated combined cathode air stream pathway and fluidly connects at an outlet end with a cathode inlet stream pathway to an SOFC stack; and wherein the second side pathway fluidly connects at an inlet end to an anode fuel stream pathway and fluidly connects at an outlet end to an anode inlet stream pathway to the SOFC stack.

The aforementioned third method and apparatus provide thermal control of an SOFC system via control of the combustion stream temperature, via control over the cathode air stream split and bypass, and via control over the temperature of the anode fuel stream. Further control of the combustion stream temperature can be obtained through cooling air being provided to the combustion stream.

Advantageously, the thermal management processes and systems of this invention function under varying operating regimes to facilitate the following objectives: maintaining desired minimum target temperatures for both anode inlet stream (Ta) and cathode inlet stream (Tc) to the SOFC stack; maintaining a target temperature differential $\Delta$Ta across the anode inlet stream and anode outlet stream of the SOFC stack; maintaining a target temperature differential $\Delta$Tc across the cathode inlet stream and the cathode outlet stream of the SOFC stack; maintaining a target temperature differential $\Delta$Ta-c across the anode inlet stream and the cathode inlet stream of the SOFC stack; and maintaining a target heating rate for the stack during system warmup and a target cool down rate for the stack during system shutdown.

DRAWINGS

Figure 3:
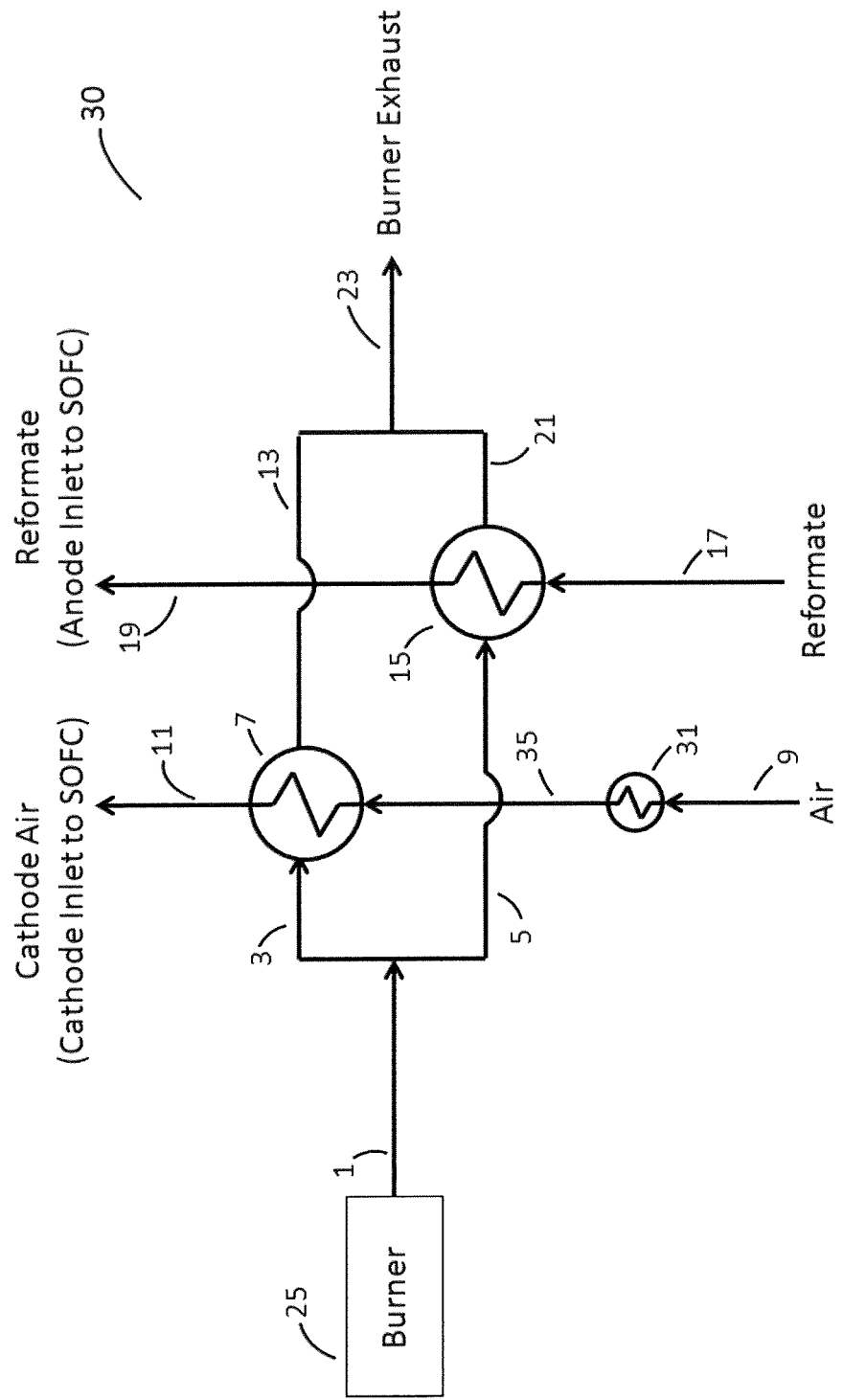

FIG. 3 presents a flow diagram depicting another embodiment of the thermal management method and apparatus of this invention.

Figure 4:
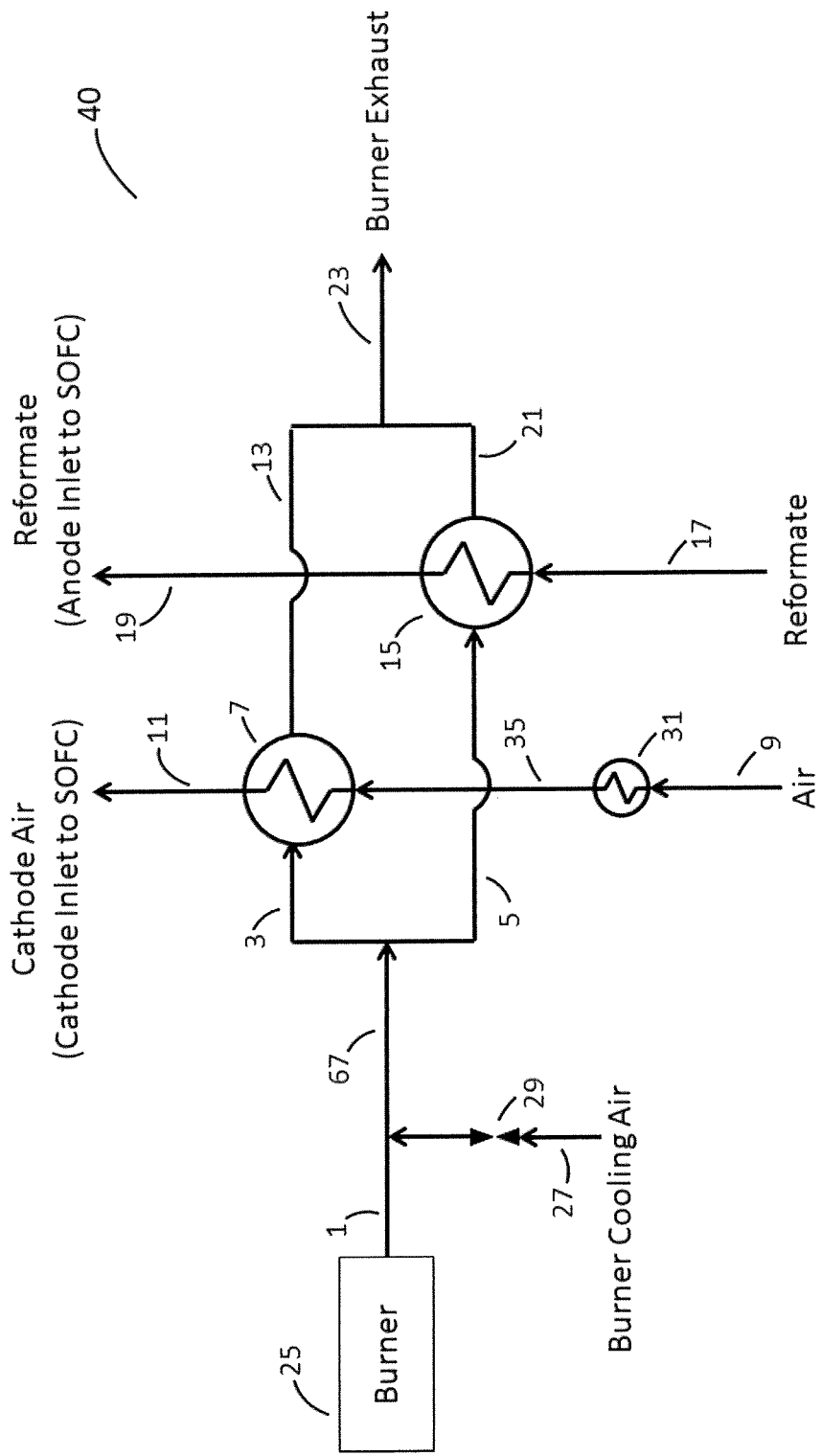

FIG. 4 presents a flow diagram depicting yet another embodiment of the thermal management method and apparatus of this invention.

Figure 5:
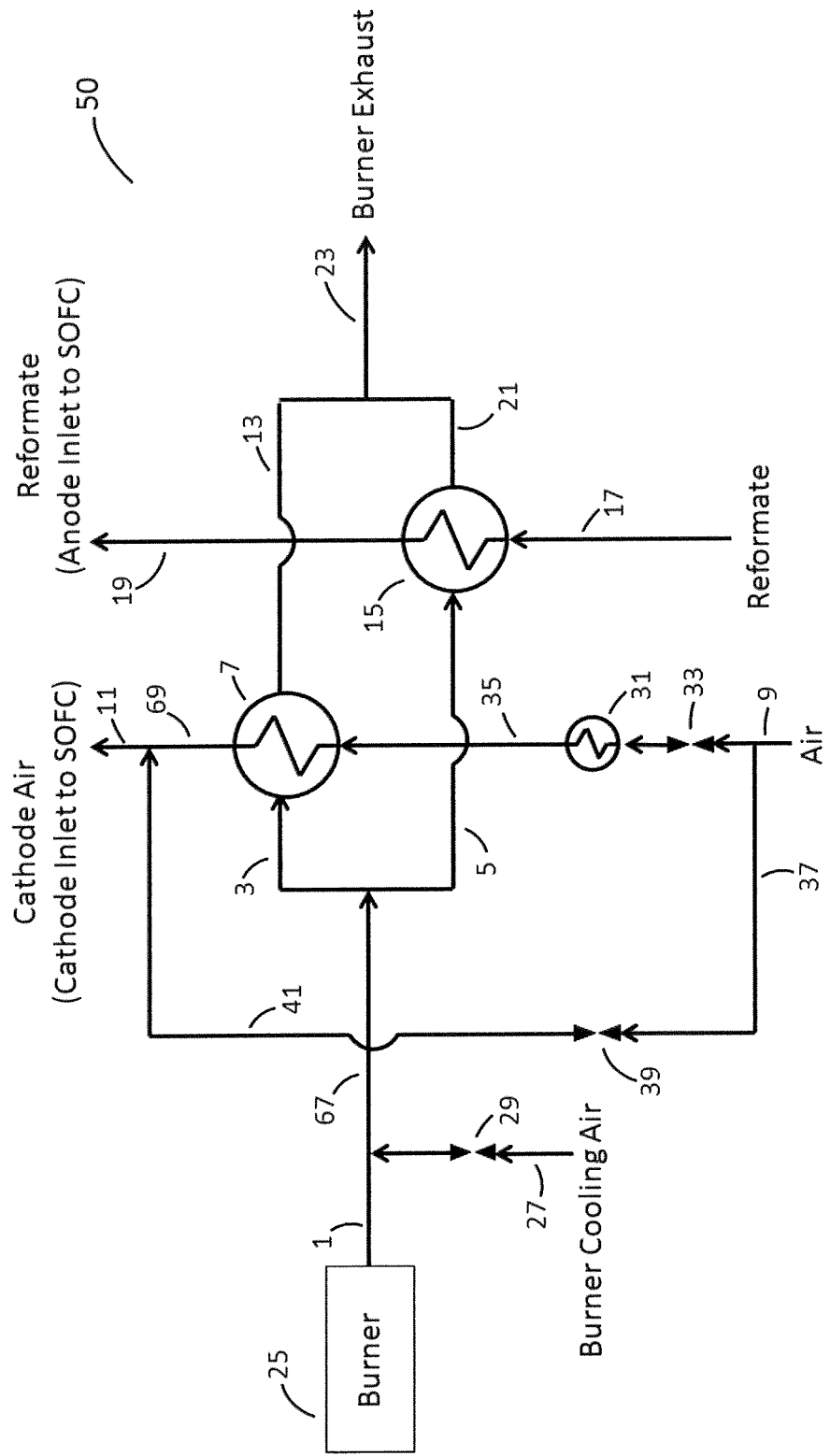

FIG. 5 presents a flow diagram depicting yet another embodiment of the thermal management method and apparatus of this invention.

Figure 6:
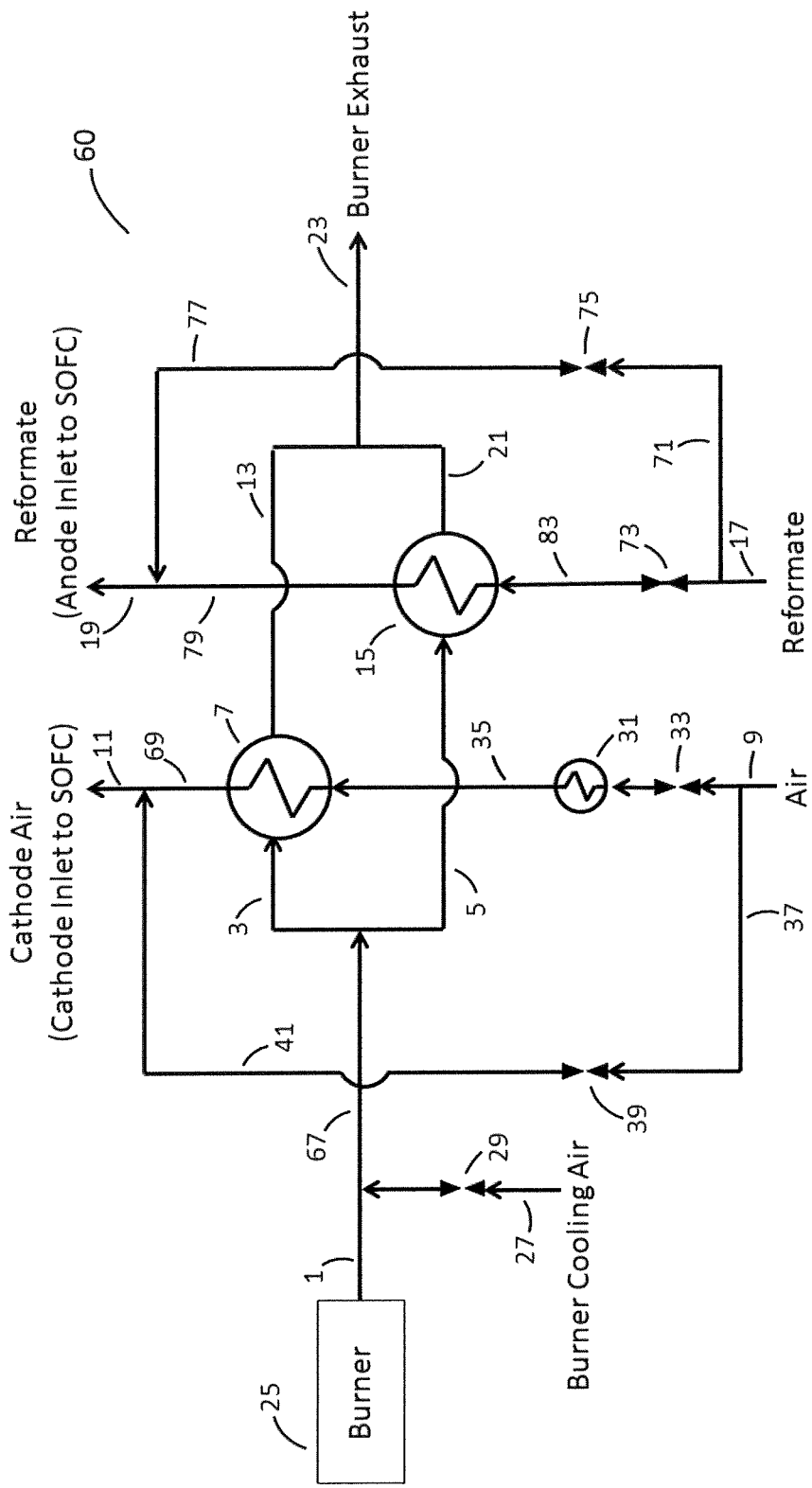

FIG. 6 presents a flow diagram depicting yet another embodiment of the thermal management method and apparatus of this invention.

Figure 7:
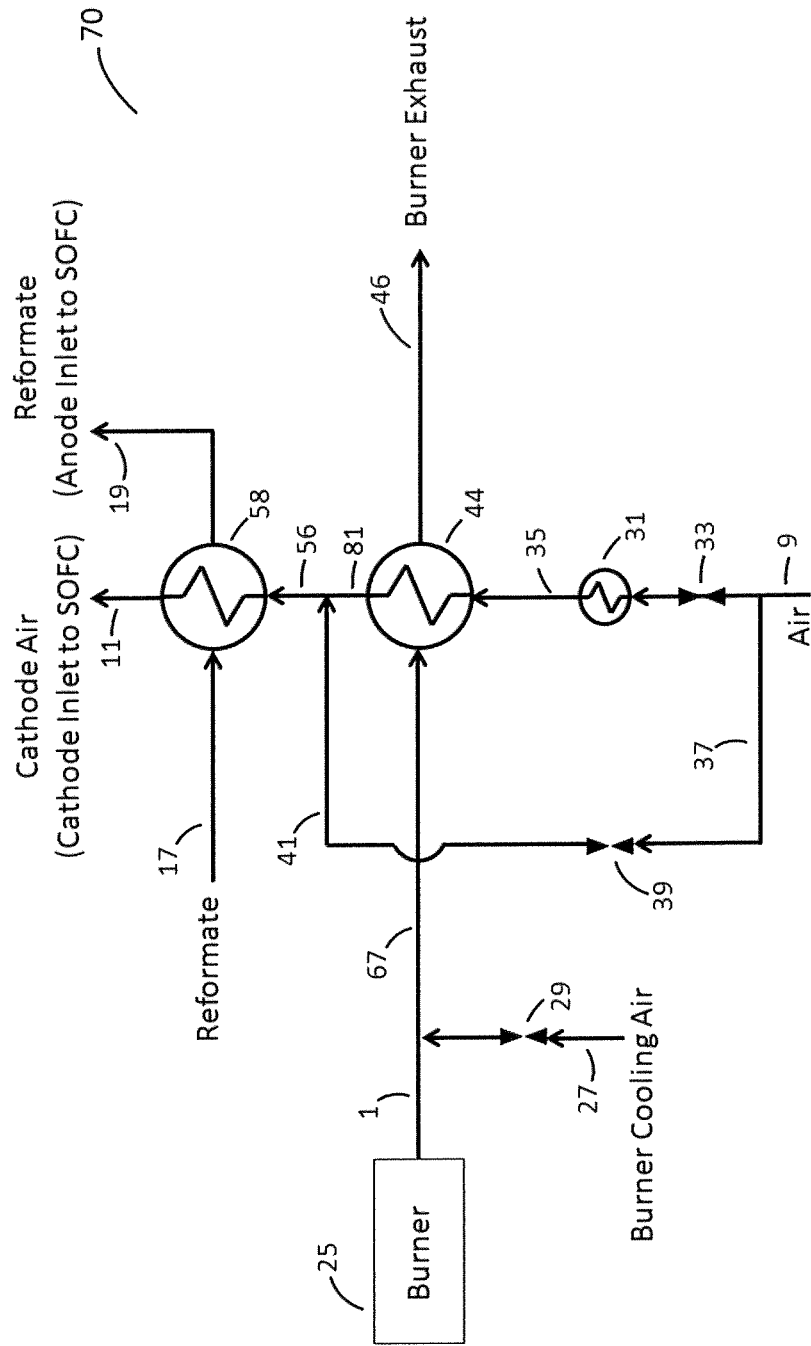

FIG. 7 presents a flow diagram depicting yet another embodiment of the thermal management method and apparatus of this invention.

DETAILED DESCRIPTION OF THE INVENTION

Figure 1:
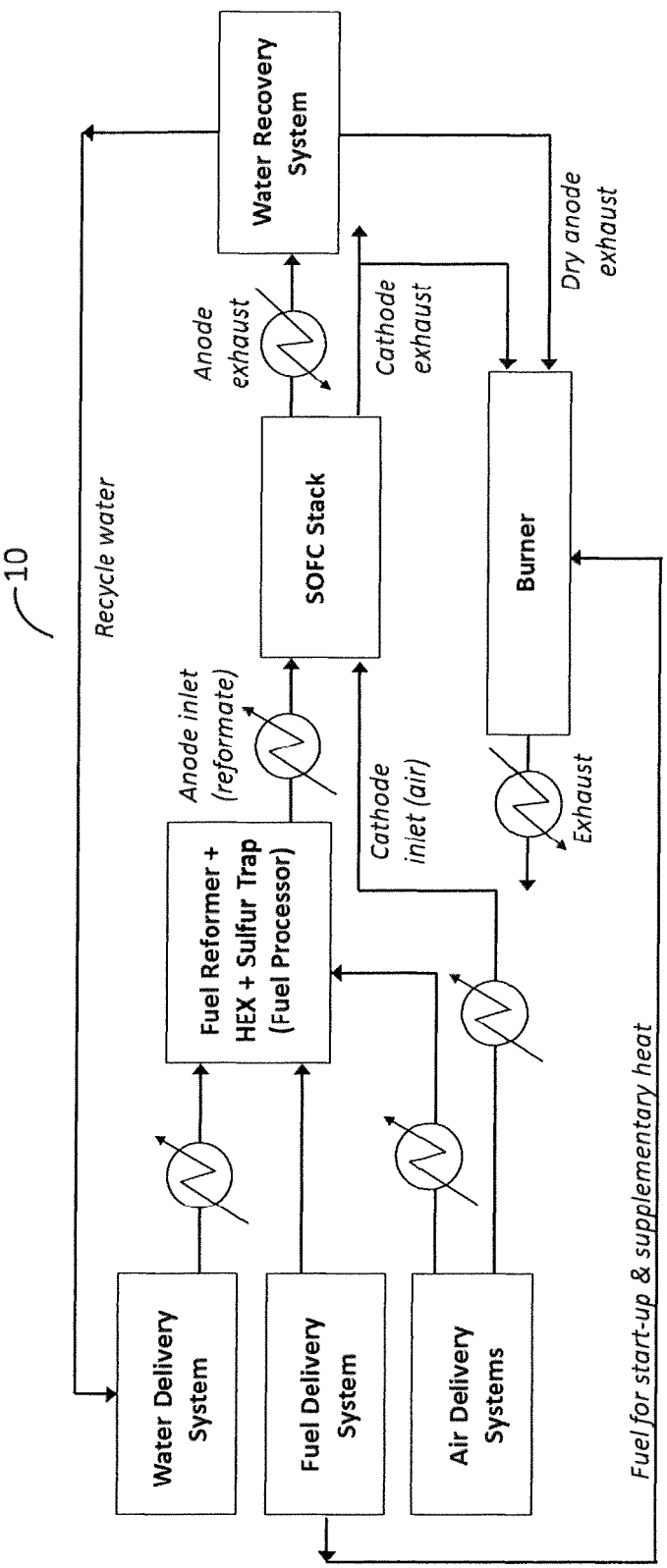
FIG. 1 depicts a conventional embodiment of a Solid Oxide Fuel Cell System.

For illustrative purposes, an example of a conventional SOFC system is provided in FIG. 1. Variants of this system are possible. The system 10 shown in FIG. 1 comprises a steam or autothermal fuel reformer (including an associated reformate heat exchanger and sulfur trap) that converts a mixture comprising a hydrocarbon fuel, such as diesel fuel, and water, and optionally an oxidant, such as air or oxygen, into a reformate product mixture comprising hydrogen and carbon monoxide. Accordingly, the fuel reformer is connected to a hydrocarbon fuel delivery system, a water delivery system, and an oxidant (air) delivery system. The SOFC system further comprises at least one solid oxide fuel cell stack (SOFC) and a burner or heat source. (The terms "burner" or "heat source" have the same meaning and are used interchangeably herein with the word "combustor.") The reformate product is fed as an "anode inlet stream" to the anode side of the SOFC; while the oxidant is delivered as a "cathode inlet stream" to the cathode side of the SOFC.

Further to FIG. 1, an anode exhaust (anode tail gas, ATG), comprising unconverted hydrogen and carbon monoxide as well as water and carbon dioxide, exiting the SOFC, is cooled to recover water. The water is recovered in a water recovery system, recycled to a water delivery system, and then delivered to the fuel reformer. After water recovery, the relatively dry anode exhaust is fed to the downstream burner or combustor. (For a system comprising a partial oxidation-based fuel reformer utilizing an oxidant, no water recovery unit is required and the anode exhaust is directly fed to the burner.) The burner is also fed with all or a portion of a cathode exhaust (cathode tail gas, CTG) exiting the cathode side of the SOFC, the portion fed depending upon an oxidant requirement of the burner, the oxidant fed to the SOFC, and the oxidant utilization of the SOFC. The CTG may be cooled via heat exchange with other process streams, if necessary, before being fed to the burner. The ATG is combusted in the burner with the CTG to generate, typically, the hottest combustion stream possible in the system within the limits of material of construction. Optionally, the system may comprise a separate hydrocarbon fuel burner for system start-up and shutdown as well as to provide additional thermal energy if needed. Alternatively, a dual-fuel burner that is capable of combusting both the native hydrocarbon fuel and the ATG or a combination thereof may be integrated into the system.

The skilled person will appreciate that the SOFC system comprises at least one SOFC stack comprising a plurality of solid oxide fuel cell repeat units. Each repeat unit comprises an anode, a solid oxide electrolyte, and a cathode, as well as interconnect plates bracketing each anode and/or cathode and current collectors that collect the current produced in each repeat unit and transfer the collected current to an external circuit. Each anode is fluidly connected to an anode inlet manifold that delivers the anode inlet stream, namely the reformate, into the anode side of the SOFC stack and an anode outlet manifold that exhausts the anode tail gas of oxidized reformate and any unconverted reformate from the anode side of the stack. Each cathode is fluidly connected to a cathode inlet manifold that delivers the oxidant, usually in the form of air or oxygen, into the cathode side of the stack and a cathode outlet manifold that exhausts the cathode tail gas of unconverted oxidant from the cathode side of the stack. Such an arrangement is typical of planar stacks. The skilled person in the art will appreciate that the SOFC system can similarly comprise tubular stack design.

Here we describe the thermal management and control strategies for an SOFC system such as that described and illustrated in FIG. 1. These strategies facilitate thermal control throughout essentially all operating regimes of start-up, steady state, transient and shut-down conditions.

The skilled person will also appreciate that each heat exchanger described hereinafter comprises first and second pathways, or more commonly a hot-side pathway and a cold-side pathway, which are independent of each other but in thermally conductive contact through a common heat conductive wall. Each pathway comprises an inlet end and an outlet end and a pathway for transporting a fluid (liquid or gas) from inlet to outlet. Heat is transferred across the thermally conductive common wall from a hot incoming stream to a cold incoming stream, each passing through their respective hot and cold pathways. At the inlet end, the hot-side pathway fluidly communicates with the incoming hot stream pathway; while at the outlet end, the hot-side pathway fluidly communicates with a cooler exhaust stream pathway. At the inlet end, the cold-side pathway fluidly communicates with an incoming cold stream pathway; while at the outlet end, the cold-side pathway fluidly communicates with a hotter exhaust stream pathway. In this invention, the heat exchangers in terms of structure, housing, and hot and cold side pathways are constructed from any materials suitably adapted for the temperatures to which the relevant structures will be exposed. Inlet and outlet connectors for transporting the combustion stream, the cathode air stream and the anode fuel stream into and out of the heat exchanger pathways are typically conventional in design, but are not limited thereto and thus may take any operable form.

Figure 2A:
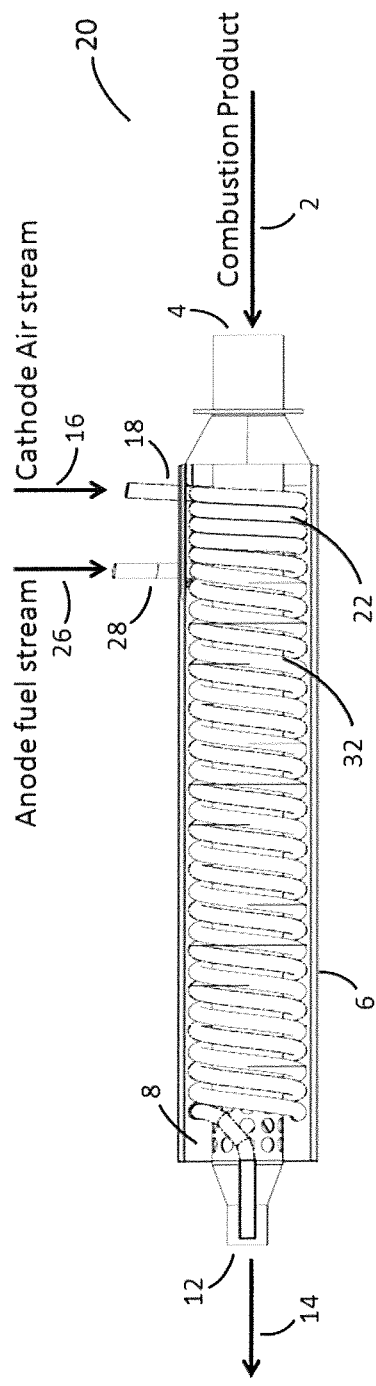
FIG. 2 depicts an embodiment of an apparatus and thermal management method of this invention.
Figure 2B:
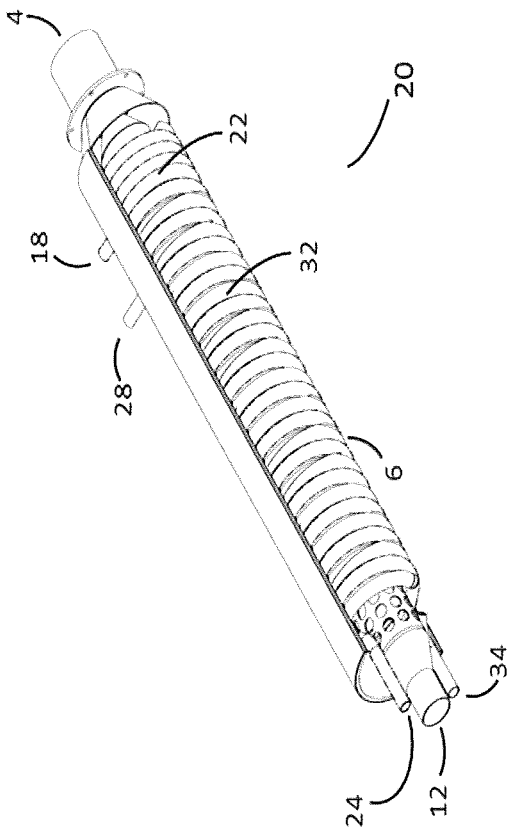

The structure and function of the thermal management systems of this invention will become apparent with a more detailed discussion of the embodiments of the invention. Reference is therefore made to FIGS. 2A and 2B illustrating a first embodiment 20 of an apparatus of this invention. FIG. 2A illustrates a heat exchanger embodiment 20 in a longitudinal cross-sectional view. FIG. 2B illustrates embodiment 20 in an isometric view. The heat exchanger 20 comprises a cylindrical tubular housing 6 having at one end combustion stream inlet 4 and at another end a combustion stream outlet 12, providing for a hot side pathway 8 from the inlet 4 through the interior of tube 6 to the outlet 12. Disposed within the tubular housing 6 are two tubular coils 22 and 32 configured, as shown, in a double helical arrangement, that is, in the form of a pair of parallel helices intertwined about a common axis. Tube 22 is provided with a cathode air stream inlet 18 and a cathode air stream outlet 24. Tube 32 is provided with an anode fuel stream inlet 28 and an anode fuel stream outlet 34.

Further to FIGS. 2A and 2B, functionally, a cathode air stream 16 is fed into the cathode air stream inlet 18 and passes through cathode air stream coil (first cool side pathway) 22 to the cathode air stream outlet 24. An anode fuel stream 26 is fed into the anode fuel stream inlet 28, passing through the anode fuel stream coil (second cool side pathway) 32, then exiting at anode fuel stream outlet 34. A hot combustion stream 2 is fed into the combustion stream inlet 4 and passes through the hot side pathway 8 exiting at combustion stream outlet 12 as cooled combustion stream 14. The hot combustion stream 2 transmits its heat to the cathode air stream 16 passing through cathode air stream pathway 22 and also transmits heat to the anode fuel stream 26 passing through the anode fuel stream pathway 32, resulting in a heated cathode air stream exiting outlet 24 and a heated anode fuel stream exiting outlet 34. The heated cathode air stream exiting outlet 24 then is fed as the cathode inlet stream to the SOFC stack; whereas the heated anode fuel stream exiting outlet 34 is fed as the anode inlet stream to the SOFC stack.

Temperature control at the anode inlet stream (Ta) to the SOFC stack and temperature control at the cathode inlet stream (Tc) to the SOFC stack are achieved by controlling the temperature of the combustion stream 2, which itself is controlled by regulating an air-to-fuel ratio (AFR) fed to a burner (not illustrated in FIG. 2) from which the combustion stream is derived. The burner can be fed, for example, with a native hydrocarbon or anode tail gas (ATG) as the fuel and with air or a cathode tail gas (CTG) as the oxidant.

A second embodiment 30 of the method and apparatus of this invention is depicted in FIG. 3. The method and associated apparatus 30 comprise a burner 25 from which is derived a primary burner combustion stream 1, which is split into a first combustion stream 3 and a second combustion stream 5. The first combustion stream 3 is passed into an inlet end of a hot side of a cathode feed heat exchanger 7. At the outlet end, the hot side of the cathode feed heat exchanger 7 exhausts a cooled first combustion stream 13. In one embodiment as shown, the cathode air stream 9 is preheated in a cathode air preheat exchanger 31 prior to entering the cool side of the cathode feed heat exchanger 7, although this preheat exchange step is optional. If the preheat exchanger is employed, then a preheated cathode air stream 35 enters the inlet of the cool side of the cathode feed heat exchanger 7. If the preheat exchanger 31 is not employed, then cathode air stream 9 is directly fed into the cool side of the cathode feed heat exchanger 7. At the cool side outlet end, the cathode feed heat exchanger 7 exhausts a heated cathode air stream, referenced as the cathode inlet stream 11, which is fed into the cathode side of the SOFC stack.

Continuing with FIG. 3, the second combustion stream 5 passes into an inlet end of a hot side of an anode feed heat exchanger 15. At the outlet end, the hot side of the anode feed heat exchanger 15 exhausts a cooled second combustion stream 21. An incoming anode fuel stream 17 passes into the inlet end of the cool side of the anode feed heat exchanger 15. At the outlet end, the anode feed heat exchanger 15 exhausts a heated anode feed stream, which is the anode inlet stream 19 fed to the SOFC stack. In this embodiment, the cooled first combustion stream 13 and the cooled second combustion stream 21 are combined and exhausted as combined cooled combustion stream 23. Optionally, the incoming anode fuel stream 17 can be preheated before it passes into the inlet end of the cool side of the anode feed heat exchanger 15.

In this second embodiment, the burner 25 combusts a fuel, for example, an anode tail gas (ATG) or a native hydrocarbon fuel, with an oxidant, for example, a cathode tail gas (CTG) or native air/oxygen, thereby producing the primary combustion stream 1. Notably in FIG. 3, the cathode air stream 9 and the anode fuel stream 17 are both thermally heated by the burner exhaust (combustion stream 1 split into streams 3 and 5). In one embodiment, the cathode feed heat exchanger 7 and the anode feed heat exchanger 15 are packaged within a single housing. In an alternative embodiment, the two heat exchangers 7 and 15 are packaged in separate housings. In both designs, the target temperatures of the cathode inlet stream 11 (Tc) and the anode inlet stream 19 (Ta) to the SOFC stack as well as the temperature differential (ΔTa-c) across the anode and cathode inlet streams are controlled by varying the temperature of the combustion stream 1. Since the ATG fuel composition and flow rate to the burner are fixed at a given operating condition of the SOFC system, the temperature of combustion stream 1 is substantially controlled by adjusting a fraction of cathode tail gas (CTG) or native air/oxygen fed to the burner, or by adjusting an amount of native hydrocarbon fuel fed to the burner, or by adjusting a combination of all three variables.

FIG. 4 depicts another embodiment 40 of the method and apparatus of this invention, which is identical to embodiment 30 of FIG. 3 with the exception that a cooling air stream 27 is fed into the primary combustion stream 1 for the purpose of moderating its temperature so as to facilitate the objectives of the invention. The resulting combined combustion stream 67 is then split into the first combustion stream 3 and the second combustion stream 5. The flow rate of the cooling air stream 27 is regulated by modulating control valve 29 in order to achieve the desired temperature of the combined burner combustion stream 67 needed to provide the desired target temperatures Tc and Ta of the cathode inlet stream 11 and the anode inlet stream 19, respectively. In an alternative embodiment, two cooling air streams are added, each one individually to the first combustion stream 3 and the second combustion stream 5. Each cooling air stream is individually controlled to independently control the temperature of the first combustion stream 3 and the second combustion stream 5. While the burner cooling air 27 provides effective control of the cathode and anode stream inlet temperatures to the SOFC stack, the cooling air may add to a parasitic loss and a slightly lower system efficiency.

FIG. 5 depicts another embodiment 50 of the method and apparatus of this invention, which is identical to embodiment 40 of FIG. 4 excepting that the cathode air stream 9, which is the primary cathode air supply, is split into a first cathode air stream 35 and a second cathode air stream 37. The first cathode air stream 35 is derived from that portion of the primary cathode air stream 9 that is not bypassed and that in one embodiment passes through control valve 33 and is preheated in preheat exchanger 31. Then, the preheated first cathode air stream 35 is fed into the cool side of the cathode feed heat exchanger 7, where it is heated and emerges as a heated cathode air stream 69. The second cathode air stream 37 is bypassed around the cathode feed heat exchanger 7, and is controlled through control valve 39, exiting as bypass cathode air stream 41, which is merged into the heated cathode air stream 69, thereby resulting in the combined cathode inlet stream 11 that is fed to the SOFC stack. It should be appreciated that cathode air control valves 33 and 39 and preheat exchanger 31 are each independently optional; and in another embodiment any one of these units or all are omitted. Likewise, the burner cooling air stream 27, which is illustrated in FIG. 5, is also optional and may be omitted. In an alternative embodiment, two cooling air streams are each individually added to first combustion stream 3 and second combustion stream 5. Each cooling air stream can be individually controlled to independently control the temperature of the first combustion stream 3 and the second combustion stream 5.

The thermal management strategy depicted in FIG. 5 provides additional control over the temperature Tc of the cathode inlet stream 11 to the SOFC stack, and is particularly useful during start-up, transients, and cool-down of the stack. In contrast, the anode inlet stream temperature Ta and the temperature differential ΔTa-c across the anode and cathode inlet streams to the stack are dependent on the temperature of the combustion stream 1 and active control of the same by virtue of adjusting the fraction of cathode tail gas or native air/oxidant and/or the amount of native hydrocarbon fuel fed to the burner 25, as previously described for FIG. 3. Accordingly, the embodiment of FIG. 5 facilitates thermal management of the cathode and anode inlet streams 11 and 19 to the SOFC stack by variation and control over the temperature of the combustion stream 1 and the amount of bypass cathode air 37/41 split off from the primary cathode air supply 9.

Another embodiment 60 of this invention is illustrated in FIG. 6, providing for a structural modification over the embodiment shown in FIG. 5. The new modification is incorporated into the reformate stream side of system 60. Here, structural features and process flows are similar to those shown in FIG. 5 with the added feature of splitting off a portion of primary reformate stream 17 as a reformate bypass stream 71. The first reformate stream 17, i.e., the portion not split off, is directed through a first reformate stream control valve 73 and thence as first reformate stream 83 into the cold side of the anode feed heat exchanger 15 exiting as heated first reformate stream 79. The second reformate stream (bypass reformate stream) 71 passes through bypass control valve 75 exiting as bypass reformate stream 77, which rejoins heat exchanged reformate stream 79. The result is combined anode inlet stream 19 fed into the anode side of the stack. Again, in the embodiment shown in FIG. 6, the burner cooling air stream 27 is optional and may be omitted if desired. Likewise, the cathode air control valve 33 and 39 and cathode air preheat exchanger 31 are each independently optional and may be omitted if desired. Either of the two reformate control valves 73 or 75 is also optional.

FIG. 7 depicts yet another embodiment 70 of the method and apparatus of this invention. A burner 25 produces a combustion stream 1. Optionally, a burner cooling air stream 27 is controlled through cooling air stream control valve 29 and passed into the combustion stream 1 to form combined combustion stream 67. The combustion stream 1 or the combined combustion stream 67, as the case may be, is fed into the hot side of cathode air heat exchanger 44. A cooler combustion stream 46 exits the hot side of cathode feed heat exchanger 44. A primary cathode air stream 9 is split into a first cathode air stream 35 and a second cathode air stream 37. In one embodiment, the primary air stream 9 (the unsplit portion) is passed through first cathode air stream control valve 33 and thence through first cathode air stream preheat exchanger 31 resulting in a preheated first cathode air stream 35. In another embodiment, the control valve 33 or 39 and preheat exchanger 31 are omitted. Accordingly, the first cathode air stream 35 or simply the cathode air stream 9 (unsplit), as the case may be, is fed into the cold side of the cathode feed heat exchanger 44, resulting in a heated cathode air stream 81 exiting the cool side of the cathode feed heat exchanger 44. Second cathode air stream 37, bypassing the cathode feed heat exchanger 44, is controlled through bypass control valve 39, emerging as bypass cathode air stream 41, which is merged into the heated cathode air stream 81. The resulting combined cathode air stream 56 is fed into a first side of an equalizer heat exchanger 58. An anode fuel stream (reformate stream) 17 is fed into a second side of the equalizer heat exchanger 58. Exiting from the first and second sides of the equalizer heat exchanger 58 are cathode inlet stream 11 and anode inlet stream 19, respectively. It is intended that the cathode inlet stream 11 and the anode inlet stream 19 are fed into the cathode and anode sides of the stack, respectively.

Utilizing burner cooling air in addition to the cathode air bypass provides for another means of controlling anode and cathode inlet temperatures, Ta and Tc, to the stack. Additionally, burner cooling air can be utilized to modulate the temperatures of the combined combustion stream 67, thus controlling the temperature of hot inlet stream to the cathode feed heat exchanger 44 to prevent thermal shock especially during system cold-start from room temperature. The skilled person will appreciate that thermal shock may result in component failure over multiple thermal cycles; therefore avoidance of such is advantageous.

The embodiment of FIG. 7 provides, on one hand, active control of the cathode and anode inlet target temperatures, Tc and Ta, to the SOFC stack via control over the temperature of the combustion stream 67, which itself relies on controlling the burner operating conditions as required by the operating regime (start-up, cooldown, transient or steady state). Advantageously, this embodiment is not overly reliant on regulating the combustion stream temperature. Additional control over the cathode and anode inlet stream temperatures is achieved by adjusting the fraction of cathode air 37 bypassed around the cathode feed heat exchanger 44 as well as controlling the temperature of the anode fuel stream 17.

The combustion stream is derived from combustion or oxidation reactions in a burner (i.e., combustor) of a hydrocarbon fuel with a source of oxygen in a burner. The hydrocarbon fuel is derived from any source of native hydrocarbon fuels or from an anode tail gas (ATG) or combination thereof. Native hydrocarbon fuels include one or more combustible gaseous and/or liquid hydrocarbons including methane, ethane, propane, butane, gasoline, kerosene, diesel, biofuel, jet propulsion fuel, and the like. The anode tail gas (ATG) typically comprises an exhaust stream from the anode side of the SOFC stack, such streams comprising unreacted hydrogen and carbon monoxide as well as non-combustible components, such as, carbon dioxide and water. It is beneficial to condense water out of the ATG so as to increase energy density of the fuel to the burner. The source of oxygen to the burner includes air or pure oxygen or a cathode tail gas (CTG) comprising unreacted air or oxygen exhausted from the cathode side of the SOFC stack.

Typically, the anode fuel (pure hydrogen or reformate) is provided to the burner at a fixed flow rate (depending on the stack operating conditions). As a consequence, the temperature of the combustion stream depends upon the flow rate of the oxidant to the burner and the fuel utilization in the SOFC stack (i.e., concentration of $H_2$ and CO remaining in the ATG). It is desirable to achieve a temperature of the combustion stream at near maximum consistent with the materials of construction of the burner and surrounding apparatus. Prior to any heat exchange, the temperature of the primary combustion stream during operation typically ranges from about 400° C. to about 1,300° C.

When the primary combustion stream 1 is split into the first combustion stream 3 and the second combustion stream 5 as seen in FIGS. 3-5, the split between the two streams depends upon the incoming temperature of the combustion stream 1 or 67, as the case may be, to the cathode heat exchanger 7 and the desired outcome temperatures Tc and Ta of the cathode inlet stream 11 and anode inlet stream 19, respectively. The amount of cathode air bypassed around the cathode air heat exchanger (FIG. 5-7 (37 or 41) typically ranges from about 0 percent to about 99 percent of the primary cathode air stream. Accordingly, the split of primary cathode air (FIGS. 5-7 (35)) sent to the cathode feed heat exchanger (FIGS. 5-6 (7) and FIG. 7 (44)) typically ranges from about 1 percent to about 100 percent of the primary cathode air stream.

The temperatures of the cathode and anode inlet streams (Tc, Ta) passing into the SOFC stack during normal operation will depend upon the type of solid oxide fuel cell employed. Typically, the temperature of the anode inlet stream ranges from about 500° C. to about 800° C. at steady state; while the temperature differential ΔTa between the inlet and outlet streams at the anode of the SOFC stack is kept at less than about 150° C. Accordingly, the ATG exiting the SOFC stack is maintained at a temperature of about 600° C. to about 850° C., up to about 900° C. It is beneficial to maintain the temperature of the cathode inlet stream as close as possible to that of the anode inlet stream (ΔTa-c ~0), although a differential up to 75° C. or even 100° C. can be tolerated. A person skilled in the art will realize these specifications are dependent on the SOFC stack components and technology, i.e., whether the repeat units are anode-supported, cathode-supported, electrolyte-supported, metal-supported as well as stack architecture (planar vs. tubular). By varying the temperature of the burner combustion stream, the split of the burner combustion stream, the split of the cathode air stream, split of the anode fuel stream, the temperature of the anode fuel stream, or any combination thereof, the desired temperature control is achievable.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

LEGENDS FOR FIGS. 2-6

FIG. 2
- 20—Thermal Management System (one heat exchanger)
- 2—combustion stream
- 4—combustion stream inlet
- 6—heat exchanger housing
- 8—combustion stream pathway
- 12—combustion stream outlet
- 14—cooled combustion stream
- 16—cathode air steam
- 18—cathode air stream inlet
- 22—cathode air stream pathway
- 24—cathode air outlet from HEX (provides cathode air inlet stream to SOFC)
- 26—anode fuel stream
- 28—anode fuel stream inlet
- 32—anode fuel stream pathway
- 34—anode outlet from HEX (provides anode inlet stream to SOFC)

FIG. 3
- 30—Thermal Management System (two Heat Exchangers with split combustion stream)
- 1—primary combustion stream
- 3—first combustion stream
- 5—second combustion stream
- 7—cathode feed heat exchanger
- 9—cathode air stream
- 11—cathode inlet stream to SOFC
- 13—cooled first combustion stream
- 15—anode feed heat exchanger
- 17—anode fuel stream (reformate stream)
- 19—anode inlet stream to SOFC
- 21—cooled second combustion stream
- 23—combined cooled first and second combustion streams
- 25—burner (combustor)
- 31— cathode air preheat exchanger
- 35—preheated cathode air stream FIG. 4
- 40—Thermal Management System (two heat exchangers with split combustion stream and burner cooling air)
- 1—primary combustion stream
- 3—first combustion stream
- 5—second combustion stream
- 7—cathode feed heat exchanger
- 9—cathode air stream
- 11—cathode inlet stream to SOFC
- 13—cooled first combustion stream
- 15—anode feed heat exchanger
- 17—anode fuel stream
- 19—anode inlet stream to SOFC
- 21—cooled second combustion stream
- 23—combined cooled first and second combustion streams
- 25—burner (combustor)
- 27—cooling air stream
- 29—cooling air stream control valve
- 31—cathode air preheat exchanger
- 35—preheated cathode air stream
- 67—combined burner combustion stream (burner stream plus cooling air stream)

FIG. 5
- 50— Thermal Management System (two heat exchangers with split combustion stream and split cathode air stream and burner cooling air stream)
- 1—primary combustion stream
- 3—first combustion stream
- 5—second combustion stream
- 7—cathode feed heat exchanger
- 9—cathode air stream
- 11—cathode inlet stream to SOFC
- 13—cooled first combustion stream
- 15—anode feed heat exchanger
- 17—anode fuel stream
- 19—anode inlet stream to SOFC
- 21—cooled second combustion stream
- 23—combined cooled first and second combustion streams
- 25—burner (combustor)
- 27—cooling air stream
- 29—cooling air control valve
- 31—cathode air preheat exchanger
- 33—cathode air first control valve
- 35—preheated first cathode air stream
- 37—second cathode air stream (cathode air bypass stream)
- 39— cathode air bypass control valve
- 41—bypass cathode air stream post control valve
- 67—combined burner combustion stream (burner stream plus cooling air stream)
- 69— heated cathode air stream FIG. 6
- 60— Thermal Management System (two heat exchangers with split combustion stream and split cathode air stream and split anode fuel stream and burner cooling air stream)
- 1—primary combustion stream
- 3—first combustion stream
- 5—second combustion stream
- 7—cathode feed heat exchanger
- 9—cathode air stream
- 11—cathode inlet stream to SOFC
- 13—cooled first combustion stream
- 15—anode feed heat exchanger
- 17—primary anode fuel stream
- 19—anode inlet stream to SOFC
- 21—cooled second combustion stream
- 23—combined cooled first and second combustion streams
- 25—burner (combustor)
- 27— cooling air stream
- 29—cooling air control valve
- 31—cathode air preheat exchanger
- 33—first cathode air stream control valve
- 35—preheated first cathode air stream
- 37—second cathode air stream (cathode air bypass stream)
- 39— bypass cathode air control valve
- 41—bypass cathode air stream post control valve
- 67—combined burner combustion stream (burner stream plus cooling air stream)
- 69— heated cathode air stream
- 71—second anode fuel stream (anode bypass stream)
- 73— first anode fuel stream control valve
- 75—second (bypass) anode fuel stream control valve
- 77—anode fuel bypass stream
- 79—heated anode fuel stream
- 83—preheated first anode fuel stream FIG. 7
70— Thermal Management System (two heat exchangers with split cathode stream and burner cooling air stream)
1—Primary combustion stream
9—primary cathode air stream
11—cathode inlet stream to SOFC
17— anode fuel stream
19—anode inlet stream to SOFC
25— burner (combustor)
27— burner cooling air stream
29—cooling air control valve
31—cathode air preheat exchanger
33—first cathode air control valve
35—preheated first cathode air stream
37—second cathode air stream (bypass cathode air stream)
39— bypass cathode air control valve
41—bypass cathode air stream post control valve
44—cathode feed heat exchanger
46—cooled combustion stream
56—combined cathode air stream (heated first cathode air stream merged with bypass cathode air stream)
58—equalizer heat exchanger
67—combined burner combustion stream (burner stream plus cooling air stream)
81— heated cathode air stream

The invention claimed is:

1. A method of thermal management of a solid oxide fuel cell system, comprising:
   (a) splitting a primary cathode air stream into a first cathode air stream with a first cathode air stream control valve and a second cathode air stream with a second cathode air stream control valve;
   (b) passing the first cathode air stream into a cool side of a cathode feed heat exchanger;
   (c) feeding from a burner a combustion stream directly into a hot side of the cathode feed heat exchanger and transferring heat from the combustion stream to the first cathode air stream so as to produce a heated first cathode air stream exiting the cathode feed heat exchanger, wherein a burner cooling air stream is fed into the combustion stream downstream of the burner;
   (d) bypassing the second cathode air stream around the cathode feed heat exchanger and a preheat exchanger and merging said second cathode air stream into the heated first cathode air stream so as to produce a combined cathode air stream;
   (e) feeding the combined cathode air stream into a first side of an equalizer heat exchanger;
   (f) feeding an anode fuel stream into a second side of the equalizer heat exchanger; and transferring heat between the first and second sides of the equalizer heat exchanger so as to provide a cathode inlet stream to a solid oxide fuel cell at a cathode inlet stream target temperature and to provide an anode inlet stream to the solid oxide fuel cell at an anode inlet stream target temperature.

2. The method of claim 1 wherein the target cathode inlet stream temperature and the target anode inlet stream temperature are controlled by varying a temperature of the combustion stream, by varying a split of the cathode air stream bypassed around the cathode air heat exchanger and the preheat exchanger, by varying a temperature of the anode fuel stream, or by a combination thereof.

3. The method of claim 1 wherein the first cathode air stream is preheated in the preheat exchanger prior to being fed into the cathode heat exchanger.

4. The method of claim 1 wherein the combustion stream is maintained at a temperature ranging from 400° C. to 1,300° C.

5. The method of claim 1 wherein a temperature Ta of the anode inlet stream to the solid oxide fuel cell is maintained between 500° C. and 800° C.; and a temperature differential Ta-c between the anode inlet stream and the cathode inlet stream ranges from 0° C. to 100° C.

6. The method of claim 1 wherein the first cathode air stream ranges from 1 percent to 100 percent of the primary cathode air stream; and wherein the second cathode air stream (bypass stream) ranges from 0 to 99 percent of the primary cathode air stream.

7. The method of claim 1 wherein the burner cooling air stream in the absence of fuel is fed into the combustion stream through a burner cooling air stream control valve.

8. The method of claim 1 further comprising:
   adding the burner cooling air stream through a burner cooling air control valve to the burner combustion stream downstream of the burner and upstream of the hot side of the cathode feed heat exchanger; controlling an inlet temperature of the hot side of the cathode feed heat exchanger.

* * * * *